UNITED STATES PATENT OFFICE 2,571,291

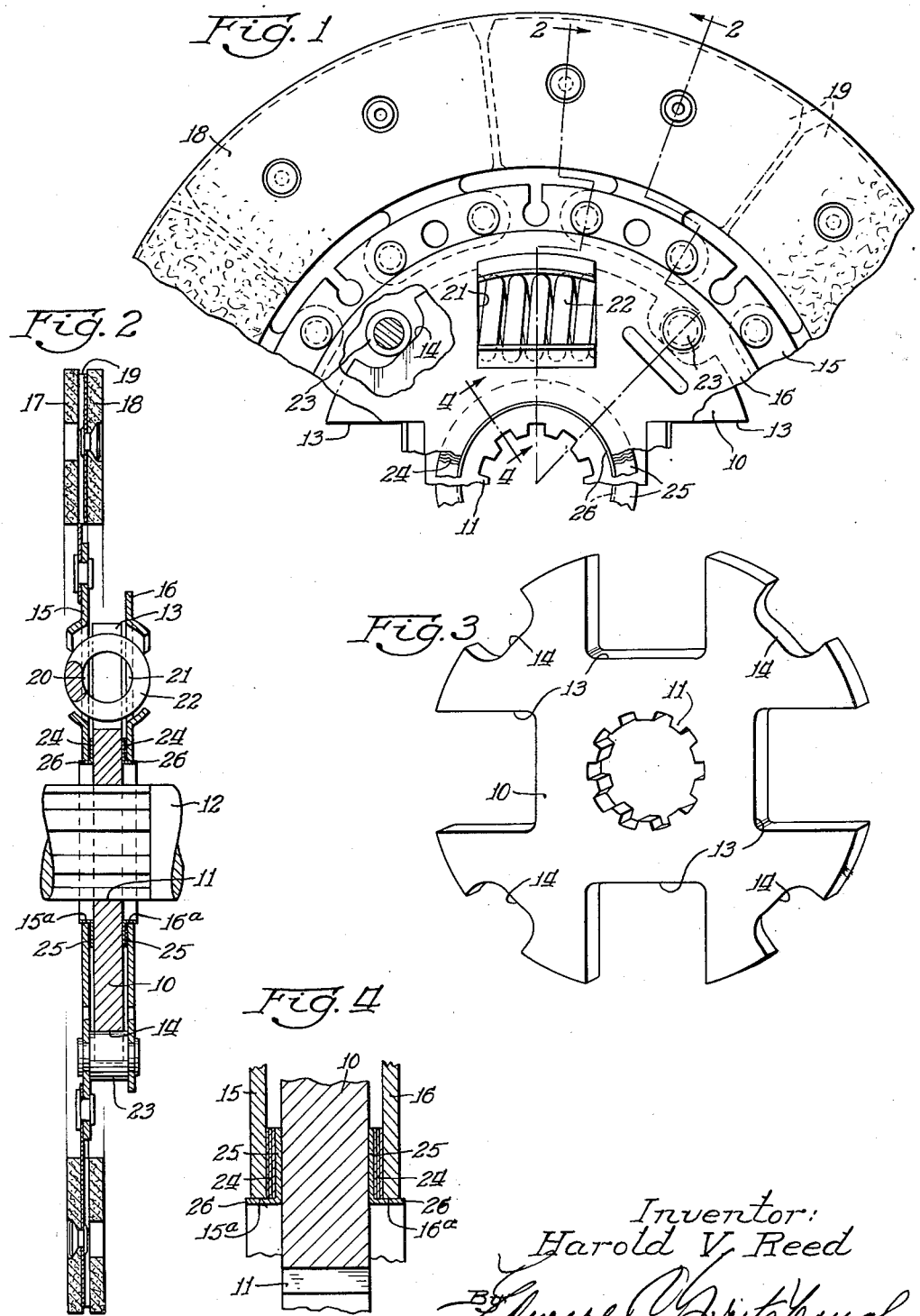

CLUTCH PLATE

Harold V. Reed, Chicago, Ill., assignor to Borg-Warner Corporation, Chicago, Ill., a corporation of Illinois Application October 1, 1947, Serial No. 777,155

6 Claims. (Cl. 64—27)

The present invention relates to clutches and more particularly to clutch friction plate assemblies.

Heretofore, it has been the practice, in a majority of clutch plate assemblies, to provide therein a hub member which comprises an axially elongated cylindrical portion having a radial flange to which is attached, in any suitable manner, an intermediate driven plate member or assembly for supporting friction facing material so that the latter will occupy an outer region or zone of the clutch plate. Such hub member at best is an expensive forging which requires machining operations to provide for the accurate and effective piloting of the driven member or intermediate plate portion, including several other parts associated therewith for effecting the well-known torsional vibration dampener which usually is employed in clutches for non-commercial motor vehicles.

It is one of the principal objects of the present invention to provide a friction clutch plate assembly wherein the expensive and heavy forging type of hub member is eliminated and in lieu thereof a disc-like stamping is provided, such stamping being a heavy metal sheet member which is preferably of a uniform thickness throughout its radial dimensions and which requires no machining operations.

Another principal object hereof is to provide effective means for piloting and restraining the driven plate member on the central disc-like member of the clutch plate.

Still another object resides in providing novel means for piloting spacer rings between the central disc and the driven plate members whereby to restrain said spacer rings against radial movement with respect to the parts associated therewith.

Additional objects, aims, and advantages of the invention contemplated herein will be apparent to persons skilled in the art, after the construction and operation of the clutch plate is understood from the within description.

It is preferred to accomplish the numerous objects of this invention and to practice the same, in substantially the manner hereinafter fully described, and as more particularly pointed out in the appended claims. Reference is made to the accompanying drawings which form a part of the specification.

In the drawings:

Fig. 1 is a vertical side elevation of a fragmentary portion of the clutch plate assembly contemplated herein, portions being broken away for clearness;

Fig. 2 is a sectional view taken along the plane of line 2—2 on Fig. 1;

Fig. 3 is a perspective view of the central disc-like member which forms a part of the present improvement; and, Fig. 4 is a sectional view taken along the plane of line 4—4 on Fig. 1 and drawn to an exaggerated scale.

The drawings are to be understood as being more or less of a diagrammatic character for the purpose of illustrating a typical or preferred form of the present invention, and in these drawings the same reference characters identify like parts in the different views.

As best shown in Fig. 2, the axial member or central region of the clutch plate assembly comprises a flat, hubless disc 10 having an axial opening 11 that is preferably splined for mounting it upon the splined portion of driven shaft 12. This central disc in its preferred embodiment is stamped from a thin metal sheet, which, as seen in Fig. 2, is approximately of uniform thickness throughout its width or radial dimension. This disc 10 defines the inner axial region of the clutch plate assembly.

During the stamping operation the disc 10 is formed with a rather deep recess 13 extending inwardly from its outer periphery, and it has shallow seats 14 positioned intermediate the recesses 13 as shown in Fig. 3, the functions of which recesses and seats will be later explained. By providing a central member of this disc-like sheet metal character, it is apparent that the usual hub member with this axially elongated cylindrical portion and its radial flange may be dispensed with, and also the machining operations, heretofore required in connection with a hub member, will not be necessary.

The intermediate region of the clutch plate comprises two washer-like plates 15 and 16, arranged one on each side of and overlapping the central disc 10 as seen in Fig. 2. One of these intermediate plates 15 is of larger diameter than the other plate 16, and it extends outwardly beyond the margin of the central disc 10 to carry friction facing material such as the rings 17 and 18 by means of spring cushion members 19. One or both of the friction material rings 17 or 18 is attached to the cushions 19 which, in turn, overlap and are riveted to the outer region of intermediate plate 15 so that the ring of cushion material is carried by the intermediate plate and supported radially outward therefrom and remote to the central disc 10. These intermediate plates 15 and 16 are provided with openings, pockets, or the like, 20 and 21 respectively, which register with the recesses 13 in the margin of the central disc 10 and said openings and recesses are adapted to receive coil springs 22, thus providing a torsional vibration dampener assembly of a type well-known in the art.

Intermediate plates 15 and 16 are tied together by means of spool pins 23, the ends of which pass through holes in the intermediate plates 15 and 16 and are upset on the outer faces thereof. The shanks of these spool pins 23 are positioned in the shallow seats 14 of the central disc 10 and have slight clearance with the bottoms of these seats. By reason of this arrangement, the intermediate plates or driven members 15 and 16 are effectively piloted on the central disc 10 and restrained against radial movement. It will be apparent that the seats 14 are longer circumferentially than the diameters of spool pins 23, thus limited relative rotative movement is effected between the central disc 10 and the intermediate assembly which comprises the driven plates 15 and 16.

For the purpose of providing frictional contact between the central disc 10 and the respective plates 15 and 16, spacers 24 are interposed between the central disc and the respective driven plates 15 and 16 in the manner shown in detail in Fig. 4. These spacers may be thin sheet metal stampings of washer-like form, and they are piloted by means of suitable retainers which co-act with the margins of axial openings 15a and 16a in the driven plates 15 and 16, respectively. These retainers comprise rings of L-shaped cross section having radial flanges 25 lying between the central disc 10 and the adjacent spacers 24. The cylindrical or axial flanges 26 of these retainers fit the openings 15a and 16a of the intermediate plates and thus maintain the spacers 24 against radial movement or dislodgment.

While this invention has been described in its present preferred form or embodiment, it will be apparent to persons skilled in the art, after understanding the improvements, that various changes and modifications may be made therein without departing from the spirit and scope thereof. It is aimed in the appended claims to cover all such changes and modifications.

What is claimed is:

1. A friction clutch plate assembly comprising an axial member defined solely by a flat central disc having a splined axial opening adapted for mounting on a rotatable shaft, said disc formed of a thick sheet metal stamping having sufficient thickness to transmit torque to the shaft and having circumferentially spaced seats in its outer margin; rigid intermediate plates arranged one on each side of said disc and each having a central opening of greater diameter than the axial opening in said central disc; and stop pins securing said intermediate plates together, said pins having their shanks engaged with the bottom walls of said central disc seats whereby to pilot said plates on said disc and restrain said plates against radial movement.

2. A friction clutch plate assembly comprising an axial member defining a flat central disc having a splined axial opening adapted for mounting on a rotatable shaft, said disc formed of a thick sheet metal stamping having sufficient thickness to transmit torque and having circumferentially spaced seats in its outer margin; rigid intermediate plates arranged one on each side of said disc and having central openings of greater diameter than the axial opening in said central disc; stop pins securing said intermediate plates together, said pins having their shanks engaged with the bottom walls of said central disc seats whereby to pilot said plates on said disc and restrain said plates against radial movement; spacer means between said disc and each intermediate plate adjacent the central openings in said plates; and annular retainers each having an axial portion in cooperative association with the central opening in the respective intermediate plates adapted to maintain said spacer means against radial movement.

3. In a friction clutch plate assembly, an axial member defining a flat central disc having a splined axial opening adapted for mounting the clutch plate on a rotatable shaft, said disc being comprised of a thick sheet metal stamping of approximately uniform thickness and defining the sole axial region of the clutch plate assembly; a supporting plate of less thickness than that of said central disc and arranged alongside said disc with its outer region extending radially outward beyond the periphery thereof, said plate having a central opening of larger diameter than said disc opening; means providing a driving connection between said disc and supporting plate; a spacer between said disc and plate at the margin of said plate opening; and a retainer ring of L-shape section arranged with its axial flange entered in said plate opening and supporting said spacer to restrain the latter against radial movement.

4. In a clutch driven plate assembly, a central supporting member for mounting the assembly for axial movement on a rotatable shaft, said member being particularly characterized by a thick annular plate of uniform thickness throughout its radial dimensions and having therein a splined axial opening for receiving the shaft, said central member having a plurality of spring-receiving seats in its outer marginal region and also having a plurality of outwardly opening notches in its outer marginal edge alternately arranged with respect to said seats; a pair of annular side plates of considerably less thickness than said central member and arranged one on each side of said central member, said annular plates each having seats therein registering with the seats in said central member; rigid means tying said annular side plates together, said means engaged in the notches in said central member whereby relative rotative movement is effected between said annular side plates and said central member; yieldable spring means positioned in said central member seats and said side plate seats for yieldably resisting said relative rotative movement between said side plates and said central member; annular spacer means interposed between axial regions of said central member and side plates; and annular retainers for maintaining said spacer means against radial movement with respect to said central member and the respective side plates.

5. In a clutch driven plate assembly, a central supporting member for mounting the assembly for axial movement on a rotatable shaft, said member being particularly characterized by a thick annular plate of uniform thickness throughout its radial dimensions and having therein a splined axial opening for receiving the shaft, said central member having a plurality of spring-receiving seats in its outer marginal region and also having a plurality of outwardly opening notches in its outer marginal edge alternately arranged with respect to said seats; a pair of annular side plates of considerably less thickness than said central member and each having a central opening of larger diameter than the axial opening in said central member, said side plates arranged one on each side of said central member, each annular plate having seats therein registering with the seats in said central member; spool rivets tying said annular side plates together for movement in unison, said rivets passing axially through and engaging the inner walls of the notches in said central member for supporting said side plates and for permitting relative rotative movement of said side plates with respect to said central member; annular spacers between said side plates and central member and supported independently of said central member; and yieldable spring means positioned in said central member seats and said side plate seats for yieldably resisting said relative rotative movement of said side plates with respect to said central member.

6. In a friction clutch plate assembly, a flat central disc having a splined axial opening adapted for mounting the clutch plate on a rotatable shaft, said disc being comprised of a thick sheet metal stamping of approximately uniform thickness and defining the sole axial region of the clutch plate assembly; annular plates arranged one on each side of said central disc and being of less thickness than said disc, said plates having central openings of larger diameter than said disc opening to space said plates radially away from the shaft; means providing a driving connection between said disc and said annular plates; flat washer-like spacers between said central disc and said plates at the margins of said plate openings; and retainer means for maintaining said spacers against radial movement, said retainer means comprising rings having radial flanges lying between said spacers and said central disc, and having axial flanges passing through said spacers and engaging the peripheries of the plate openings.

HAROLD V. REED.

REFERENCES CITED

The following references are of record in the file of this patent:

UNITED STATES PATENTS

| Number | Name | Date |
|---|---|---|
| 2,019,198 | Spase | Oct. 29, 1935 |
| 2,176,696 | Wemp | Oct. 17, 1939 |
| 2,221,823 | Thelander | Nov. 19, 1940 |
| 2,314,948 | Nutt | Mar. 30, 1943 |